United States Patent [19]
McDonough et al.

[11] 4,328,740
[45] May 11, 1982

[54] COFFEE MAKER WITH A VARIABLE BREW STRENGTH APPARATUS

[75] Inventors: Robert M. McDonough, Hatfield; Thomas E. Hanson, Phoenixville; Richard H. Brill, Philadelphia; Ronald W. Oates, Chalfont, all of Pa.

[73] Assignee: SCM Corporation, New York, N.Y.

[21] Appl. No.: 219,408

[22] Filed: Dec. 22, 1980

[51] Int. Cl.³ ............................................. A47J 31/10
[52] U.S. Cl. ....................................... 99/295; 99/305; 99/317; 99/285
[58] Field of Search ................. 99/295, 300, 305, 306, 99/307, 313, 314, 316, 317, 285

[56] References Cited

U.S. PATENT DOCUMENTS

| | | | |
|---|---|---|---|
| 4,056,050 | 11/1977 | Brown | 99/305 |
| 4,064,795 | 12/1977 | Ackerman | 99/305 |
| 4,147,097 | 4/1979 | Gregg | 99/305 |
| 4,207,809 | 6/1980 | Brill | 99/295 |
| 4,266,471 | 5/1981 | Rosengren | 99/305 |

Primary Examiner—Robert W. Jenkins
Attorney, Agent, or Firm—Ernest F. Weinberger

[57] ABSTRACT

In accordance with the present invention, there is provided a coffeemaker with a variable brew strength apparatus which comprises a base which contains a water reservoir and a heater and which supports a coffee carafe. The base supports a variable brew strength apparatus directly over the coffee carafe. The variable brew strength apparatus includes a water restrictor member which is rotably mounted on the cover of a coffee basket member. The water restrictor member and the coffee basket member, in combination, form a valve which either admits heated water to an inner basket which is mounted in the coffee basket and which contains ground coffee, or causes a portion of the heated water to bypass the inner basket and enter the coffee basket to mix with and dilute coffee brewed in the inner basket. The coffee basket supports a special coffee scoop which has a tabular indicia relating the number of cups of coffee desired, the brew strength desired, and the number of scoops of coffee required. Brew strength indicia are provided on the cover of the coffee basket to facilitate the brewing of coffee using an optimum ratio of coffee and water.

14 Claims, 17 Drawing Figures

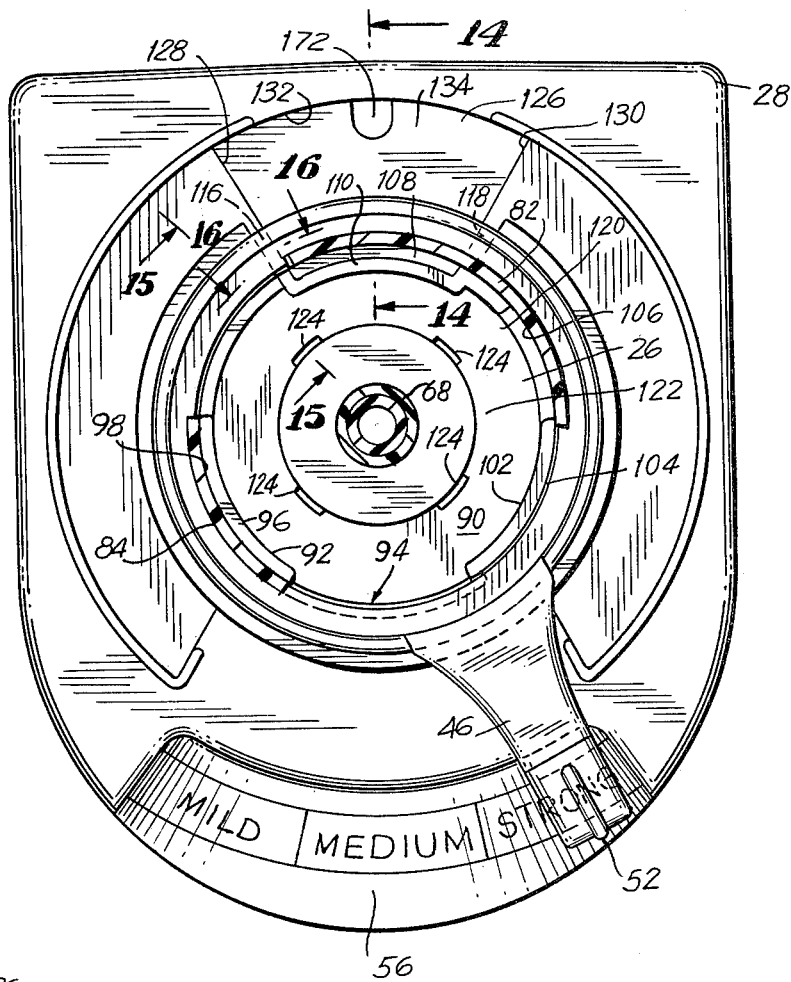
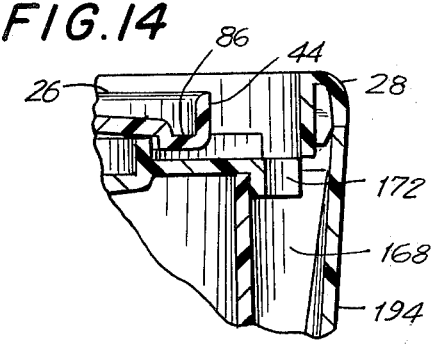
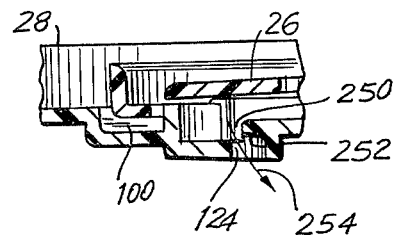
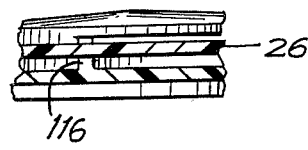
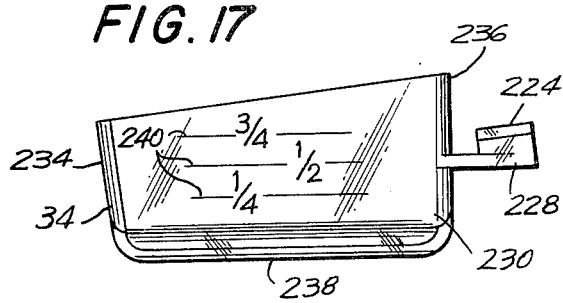

COFFEE MAKER WITH A VARIABLE BREW STRENGTH APPARATUS

BACKGROUND OF THE INVENTION

The prior art related to the brewing of coffee includes a wide variety of different types of apparatus. One of the problems common to all of this apparatus is the difficulty encountered in producing a satisfactory brew for the entire range of use which includes relatively small numbers of cups and relatively large numbers of cups and also relatively mild brews as well as relatively strong brews.

In order to provide a definition of a desirable brew, the Coffee Brewing Institute has issued a Standard for Ideal Coffee which indicates that an ideal coffee brew consists of a ratio of 10 grams of coffee per 6 ounces of water. The proper technique for preparing mild coffee is to prepare a brew in accordance with the above ratio and then to dilute the brew with hot water to the mild state. This technique is utilized in apparatus which is shown in U.S. Pat. No. 4,108,053 to R. C. Vink and in apparatus which is shown in U.S. Pat. No. 4,056,050 to R. N. Brown.

U.S. Pat. No. 4,108,053 to R. C. Vink shows a device which incorporates a relatively complex valve apparatus to admit heated water to a basket in which coffee has been placed for brewing or, when desired, to permit a portion of the heated water to bypass the coffee basket and then mix with and dilute the coffee brew in order to obtain a weaker brew. The apparatus shown suffers from a number of deficiencies among which is the relatively great complexity of the valve device. Another deficiency is the inability of the apparatus to brew relatively small numbers of cups of coffee, 3 to 5 cups, as well as relatively large numbers of cups of coffee, 12 cups. To overcome this deficiency, the apparatus utilizes a mini basket, FIG. 11, which must be inserted into the main coffee basket. This is a disadvantage because the consumer must store and remember to insert the mini basket when needed and must also carefully measure out the correct amount of coffee using measuring apparatus which is not furnished. In practice, this often results in either too much or too little coffee being used, resulting in either a weak and unsatisfactory brew or too strong a brew and excess use and waste of coffee grounds.

U.S. Pat. No. 4,056,050 to R. N. Brown shows a device which also incorporates a valve mounted above a coffee basket to vary the quantity of heated water which bypasses the coffee basket in order to dilute the coffee brew which has been brewed in the coffee basket. Like U.S. Pat. No. 4,108,053 no provisions are included for accurate measurement of the coffee grounds and like U.S. Pat. No. 4,108,053, the path of the heated water to the coffee grounds is relatively direct with relatively little flow restrictions. This lack of suitable flow restriction often results in too rapid a flow of the heated water through the coffee grounds and insufficient brewing time.

Both the above cited prior art patents teach that in order to brew a specific amount of coffee e.g. number of cups, a fixed amount of ground coffee is used per cup, irrespective of the desired strength. The water bypass structure is employed to vary the strength of the brewed coffee. Thus, except for strong or full strength coffee, satisfactory, efficient extraction of coffee flavor cannot be attained.

OBJECTS OF THE INVENTION

It is an object of the present invention to overcome the deficiencies of the prior art by providing a coffeemaker which is capable of easily and efficiently brewing both small and large numbers of cups of coffee and which can be operated to produce a mild, medium or strong coffee brew strength thereby eliminating waste of ground coffee.

Another object of the present invention is to provide a coffeemaker with a convenient and accurate device for measuring the required amount of coffee and thereby achieve efficient extraction of coffee flavor.

Another object of the present invention is to provide a coffeemaker with a variable brew strength apparatus, the component parts of which can be easily disassembled for cleaning and conveniently reassembled without the use of tools.

Still another object of the present invention is to provide a coffeemaker with a variable brew strength apparatus having relatively few parts, which can be easily manufactured in high volume at a relatively low unit cost.

SUMMARY OF THE INVENTION

In accordance with the present invention, there is provided a coffeemaker which includes a base which contains a water reservoir, a coffee container, or carafe, which is mounted on the base, directly above a heater, which is operated by household current for the purpose of heating the water in the reservoir and also heating the carafe and also includes a variable brew strength apparatus.

The variable brew strength apparatus is mounted on the base directly above the coffee carafe and receives heated water via a tube. The apparatus includes a water restrictor member a coffee basket cover, an inner basket, a coffee basket and a special coffee scoop. The water restrictor member is rotationally positionable with respect to the coffee basket cover and includes an indicator member which can be positioned in alignment with the indicia MILD, MEDIUM or STRONG which are formed on the coffee basket cover. The water restrictor has arcuate slots and wall portions which cooperate with dam members formed on the coffee basket cover to form a valve arrangement for the purpose of allowing water to flow into the inner basket, which is mounted in the coffee basket and which contains ground coffee or, when desired, allowing a measured portion of the water to bypass the inner basket and flow directly into the coffee basket. The bypass water serves to dilute the coffee which is brewed in the inner basket and which flows into the coffee basket through a triangular latticework. For mild coffee approximately 60% of the water flows into the inner basket and approximately 40% of the water bypasses the inner basket and flows directly into the coffee basket. For medium coffee approximately 80% of the water flows into the inner basket and approximately 20% of the water bypasses the inner basket and flows directly into the coffee basket.

The coffee basket includes mounting provisions for mounting the special coffee scoop which together with the water restrictor and coffee basket cover form a major novel feature of the invention. The coffee scoop includes, on a side wall portion, indicia which indicate fractional volumetric portions of the scoop. The back wall of the scoop, which is visible when the scoop is mounted on the coffee basket, includes a tabular index which presents the relationship between the number of cups of coffee desired, the strength of the brew desired, and the number of scoops or portions thereof required for an ideal brew.

The apparatus according to the invention, through the combination of the special coffee scoop and the coffee basket bypass valve arrangement facilitates the brewing of coffee in accordance with the recommended ratios for ideal coffee and eliminates overuse and waste of coffee.

BRIEF DESCRIPTION OF THE DRAWINGS

Additional objects and advantages of the present invention will become apparent during the course of the following specification when taken in connection with the accompanying drawings in which:

FIG. 13 is a top view, partially in section of the coffee basket with the flow control member shown in place;

FIG. 14 is a fragmentary cross-sectional view taken along the line 14—14 of FIG. 13;

FIG. 15 is a fragmentary cross-sectional view taken along the line 15—15 of FIG. 13;

FIG. 16 is a fragmentary cross-sectional view taken along the line 16—16 of FIG. 13, and FIG. 17 is a side elevation view of the coffee scoop member.

DETAILED DESCRIPTION OF THE PREFERRED EMBODIMENT

Figure 2:
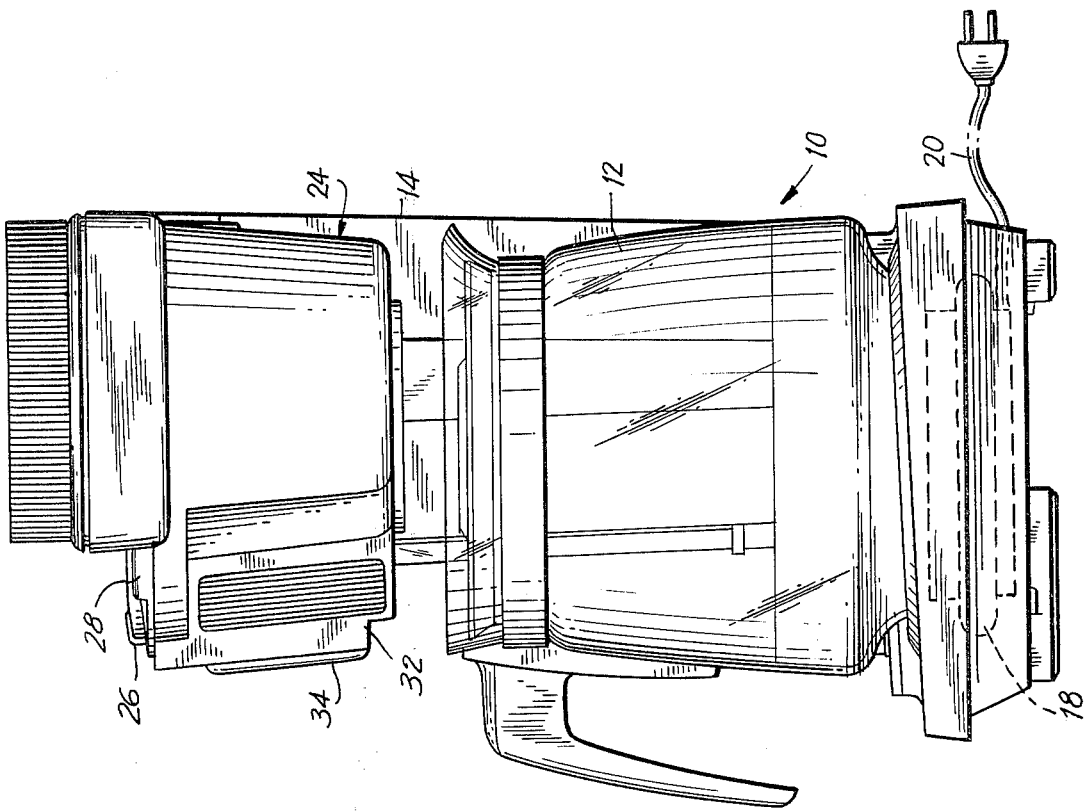
FIG. 2 is a front elevation view of the coffeemaker of FIG. 1.
Figure 1:
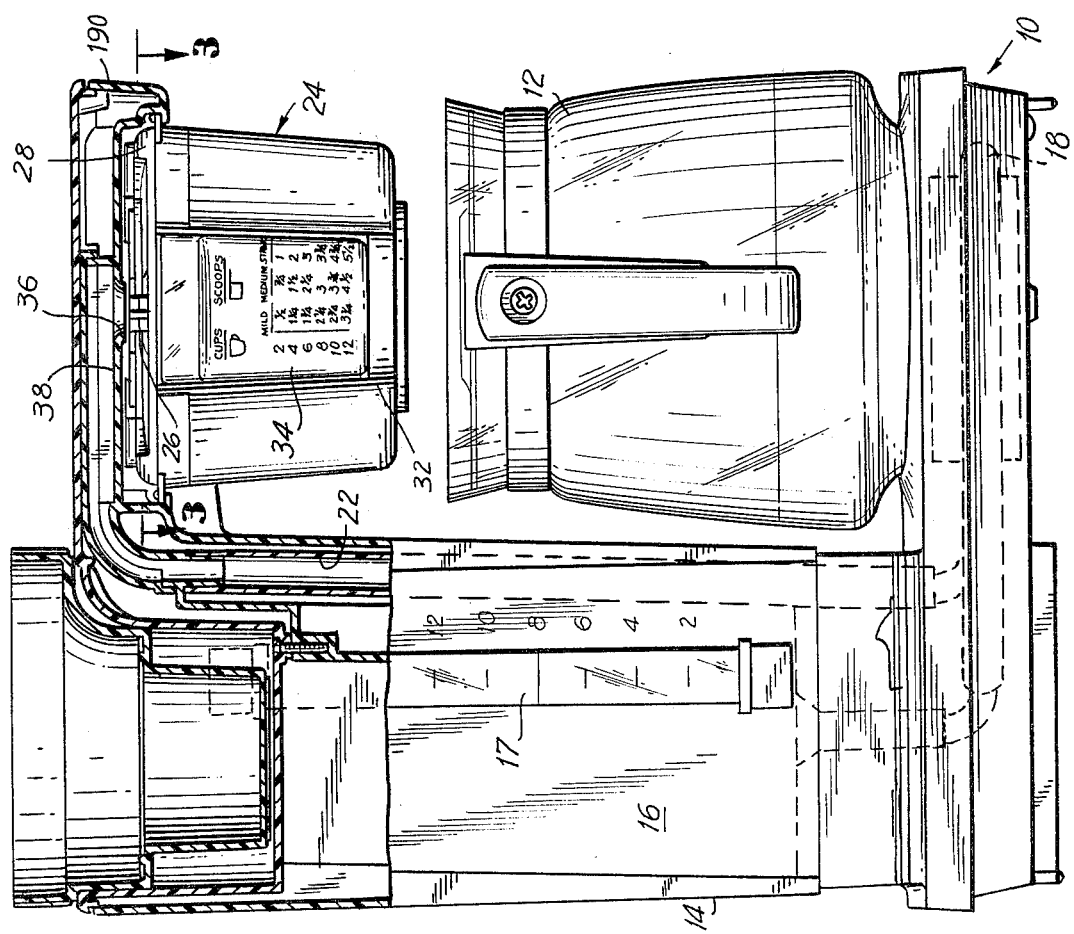
FIG. 1 is a side elevation view of a coffeemaker with a variable brew strength apparatus, in accordance with the present invention, with the device shown partially in section.

With reference to the drawings, there is shown in FIGS. 1 and 2 a coffeemaker with a variable brew strength apparatus 10 in accordance with the present invention. The coffeemaker 10 includes a coffee pot 12, a base 14 which supports the coffee pot 12 and within which there is mounted a water reservoir 16, and a heater and pump element 18, which is operated by household current via the line cord 20 to heat water from the reservoir 16 and for heating the base of the coffee pot 12. The heated water is supplied, via the tubing 22, to the variable brew strength apparatus 24 which forms the major novel feature of the invention.

Figure 5:
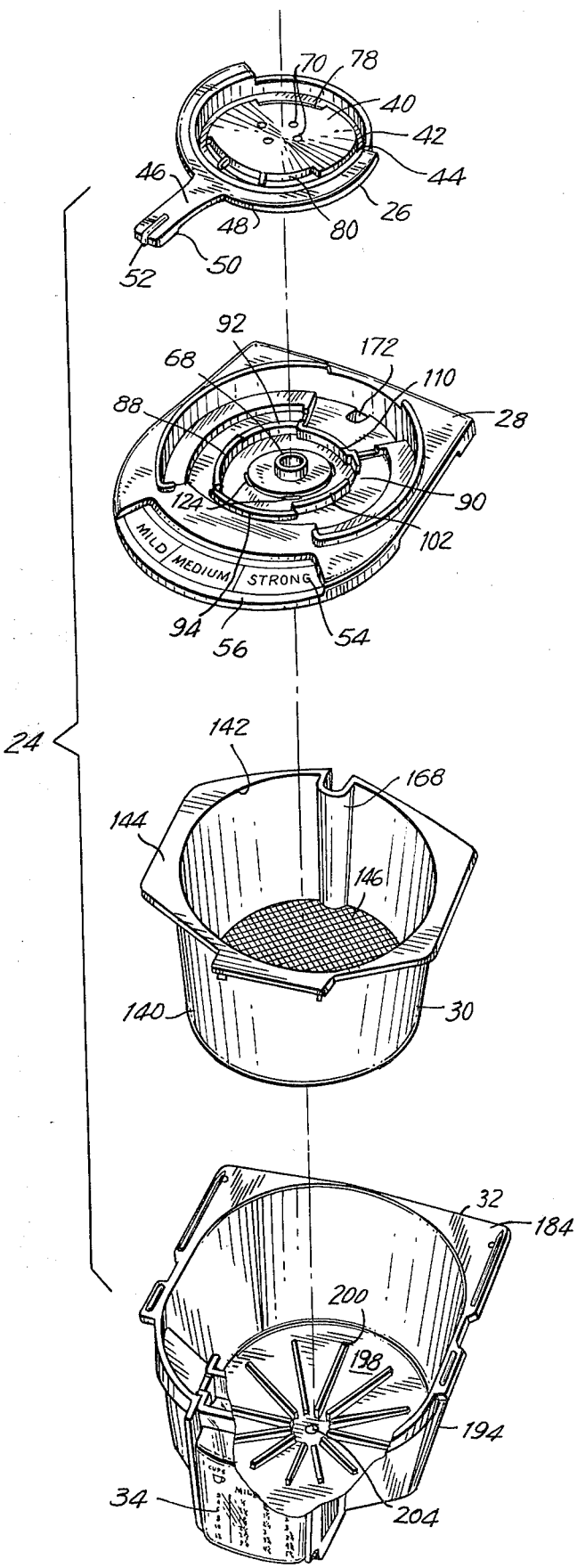
FIG. 5 is an exploded view of the variable brew strength of the coffeemaker of FIG. 1.

The variable brew strength apparatus 24 is shown in an exploded view in FIG. 5. The major components of the apparatus 24 include a water restrictor member 26, a basket cover 28, an inner basket 30, and a basket 32, on which there is mounted a coffee scoop member 34. The construction and operation of each of these components will be described in detail.

Figure 6:
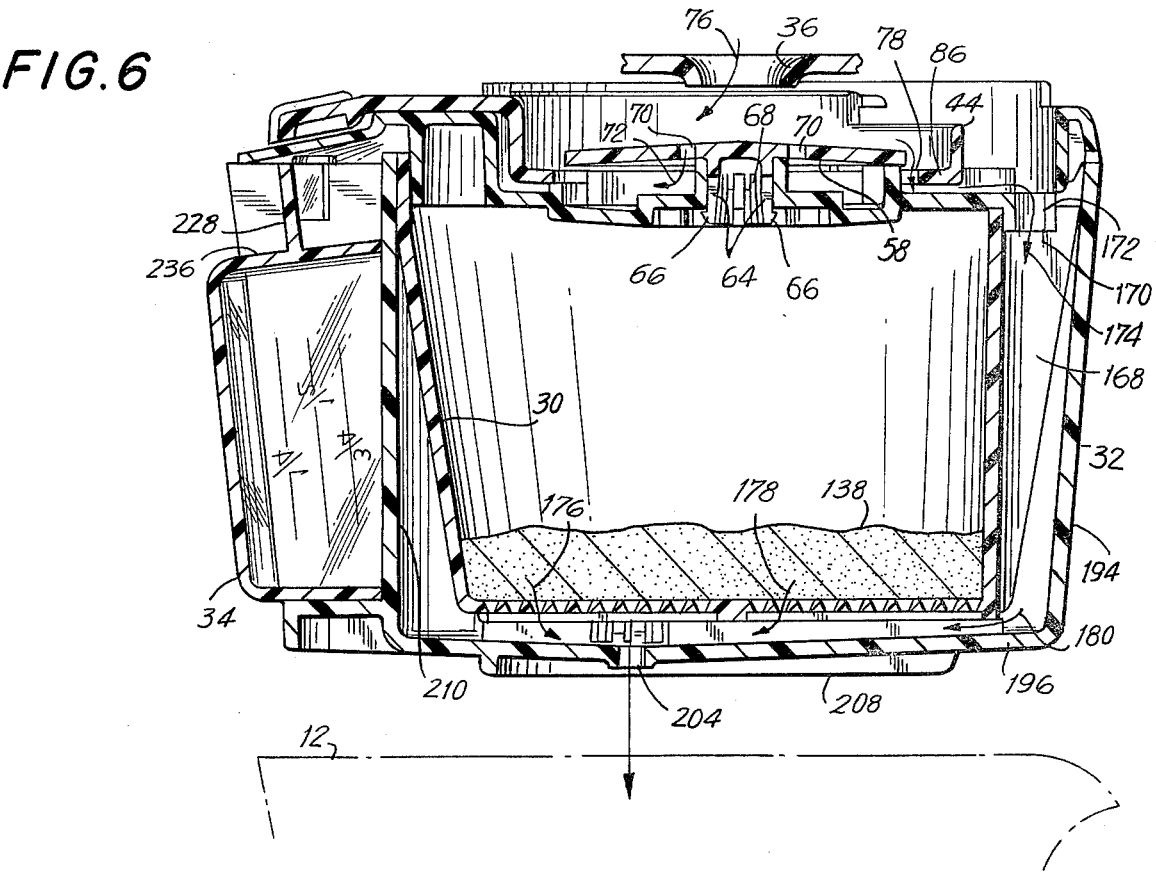
FIG. 6 is a cross-sectional view taken along the line 6—6 of FIG. 3.
Figure 12:
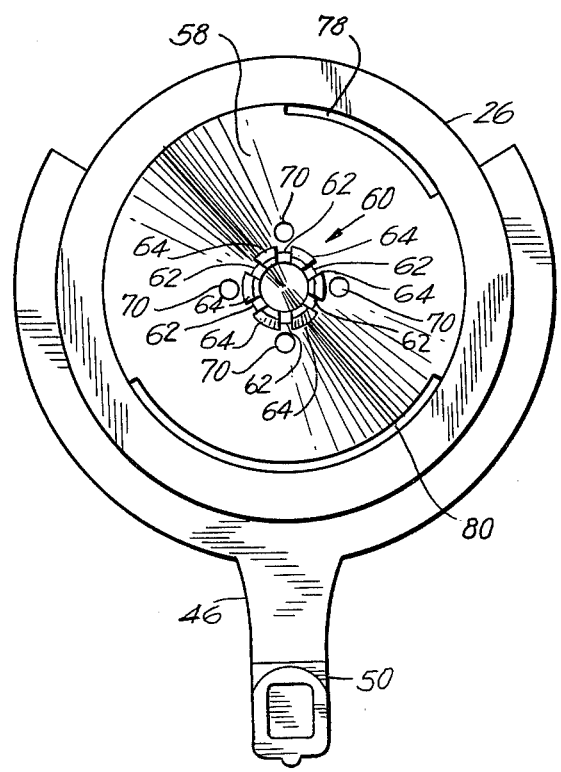
FIG. 12 is a bottom view of the flow control member of the coffeemaker of FIG. 1.

The water restrictor member 26 receives heated water from an opening 36 in the orifice plate 38 which is mounted on the base 14. The water restrictor member 26 comprises a generally circular central portion 40 around which there is formed a circular trough 42 which is bounded by an upturned lip 44. An indicator member 46 projects radially outwardly from a portion 48 of the upturned lip 44 and the end portion 50 of the indicator member 46 includes an index mark 52 which cooperates with indicia 54 formed on the surface 56 of the basket cover 28 in a manner which will be presently described. As is best shown in FIGS. 6 and 12, the bottom surface 58 of the water restrictor 26 member includes a central core member 60 which is hollow and which includes a plurality of radial slots 62 which divide the central core 60 into a plurality of downwardly projecting fingers 64. The lower portion of each of the fingers 64 includes an outwardly directed portion 66 which enables the water restrictor member 26 to grip the coffee basket cover 28 when the central core member 60 is inserted into the central hole 68. When disassembly is required for cleaning, the water restrictor member 26 is pulled upward away from the coffee basket cover 28 and the projecting fingers 64 are forced inwardly enabling the portions 66 to pass through the central hole 68. Proximate to the central core, holes 70 are provided which pass through the central member 40 to ensure that sufficient heated water passes through the water restrictor member 26 as is shown by the arrows 72, 74, 76 in FIGS. 6 and 7, and as will be described presently.

The water restrictor member 26 includes a pair of arcuate slots 78, 80 which are formed at the boundary of the generally circular central portion 40 and the circular trough 42. When viewed from the bottom as in FIG. 12, the arcuate slot 78 extends from appproximately 0 degrees to approximately 60 degrees. The arcuate slot 80 extends from approximately 120 degrees to approximately 240 degrees. The slots 78, 80 are further defined by the circular wall portions 82, 84 which project downwardly from the central portion 40 to the bottom surface 86 of the circular trough 42. The wall portions 82, 84 are shown in section in FIG. 13. Referring to FIGS. 13, 14 and 16, the water restrictor member 26 is viewed from the top and the wall portion 82 forms a circular arc extending from approximately 0 degrees to approximately 120 degrees. The wall portion 84 forms a circular arc extending from approximately 240 degrees to approximately 300 degrees.

The wall portions 82, 84 closely fit around selected outer surfaces of the dam members 88 which project upwardly from the central portion 90 of the coffee basket cover 28. The dam members 88 include a first arcuate portion 92 and a second arcuate portion 94. The first portion 92 extends from approximately 240 degrees to approximately 360 degrees when viewed as in FIG. 13. The outer surface 96 of the first portion 92 fits the inner surface 98 of the wall portion 84. The second portion 94 extends from approximately 180 degrees to approximately 240 degrees. The second portion 94 has a height somewhat lower than the height of the first portion 92 and is disposed radially slightly outwardly as compared with the first portion 92 so that the second portion 94 is in general alignment with the slot 80, thereby enabling heated water to flow into the central portion 90 on the inside of the dam members 88. Although it is not intended, a portion of the water may flow over the dam 88 and then into central portion 90. A third portion 102 extends from approximately 120 degrees to approximately 180 degrees and is disposed at the same radius as the first portion 92 and the outer surface 104 of the third portion 102 closely fits the inner surface 106 of wall member 82. The fourth portion 110 extends from approximately 0 degrees to approximately 60 degrees and is disposed at a radius which is shorter than the radius of the first, second or third portions so that water is blocked from flowing through the passage 108 by the wall portion 82 when the water restrictor 26 is disposed as is shown in FIG. 13. When the indicator member 46 of the water restrictor member 26 is moved from the position shown in FIG. 13 into alignment with the indicia MEDIUM on the surface 56, the wall portion 82 rotates in a clockwise direction.

When the indicator member 46 of the water restrictor 26 is moved into alignment with the indicia MILD on the surface 56 the wall portion rotates further in the clockwise direction.

When the indicator member 46 is in alignment with the indicia STRONG as is shown in FIG. 13, the slot 78 and the passage 108 are blocked and the heated water is forced to flow either through the holes 70 or through the slot 80. The water which flows through the slot 80 flows into the central portion 90 which is defined by the dam members 88. If for any reason the heated water cannot be totally contained by the water restrictor 26, the excess water will flow over the upturned lip 44 into the space 126 or the trough 100 which is defined by the circular wall 112, the dam members 88, the floor portion 114 and the shallow wall members 116, 118. The general cross-sectional configuration of the trough 100 is best shown in FIG. 15. The water flows from the trough 100 through the space 120 into the center portion 122 and then downward into the inner basket 30 through the four slots 124.

Figure 11:
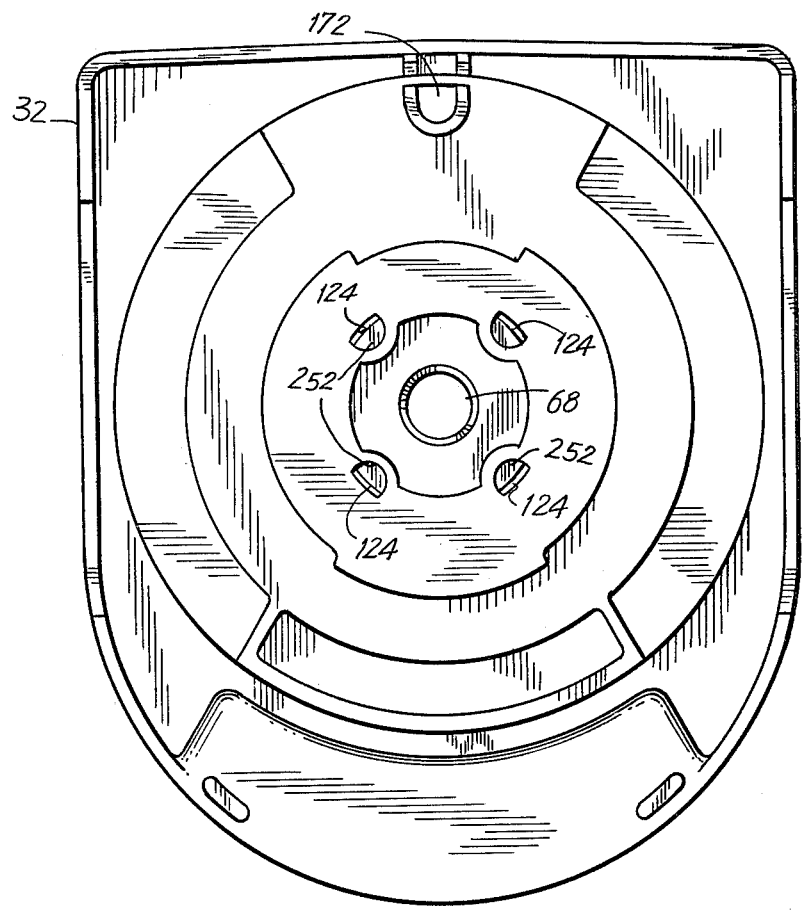
FIG. 11 is a bottom view of the coffee basket member of the coffeemaker of FIG. 1.

As is shown in FIGS. 11 and 15, the slots 124 include an opening 250 and an undercut portion 252 which presents a sudden or rapid increase in the size of the flow passage. This discontinuity in the shape of the flow passage minimizes the action of capillary forces on the flow of water, which tend to make the flow discontinuous. The flow of water passing through the slots 124, shown by the arrow 254 in FIG. 15, thus is made both relatively smooth and continuous.

As shown in FIG. 13, when the indicator member 46 is in alignment with either the indicia MEDIUM or the indicia MILD, the passage 108 between the shallow walls 116, 118 is only partially blocked for MEDIUM and the passage is completely unblocked for MILD. This permits a portion of the heated water to pass through the slot 78 in the water restrictor member 26 and into the space 126 which is defined by the walls 116, 118, 128, 130, 132 and the bottom surface 134. Water entering the space 126 flows into the bypass orifice 172 and does not pass into the inner basket 30 which contains the coffee grounds 138.

In accordance with the present invention, it has been determined that an optimum distribution of heated water for medium strength coffee comprises approximately 80% of the water passing into the inner basket 30 and approximately 20% of the water bypassing the inner basket 30 and flowing directly into the basket 32. For mild strength coffee, an optimum distribution of heated water has been found to comprise approximately 60% of the water passing into the inner basket 30 and approximately 40% of the water bypassing the inner basket 30 and flowing directly into the coffee basket 32.

Figure 8:
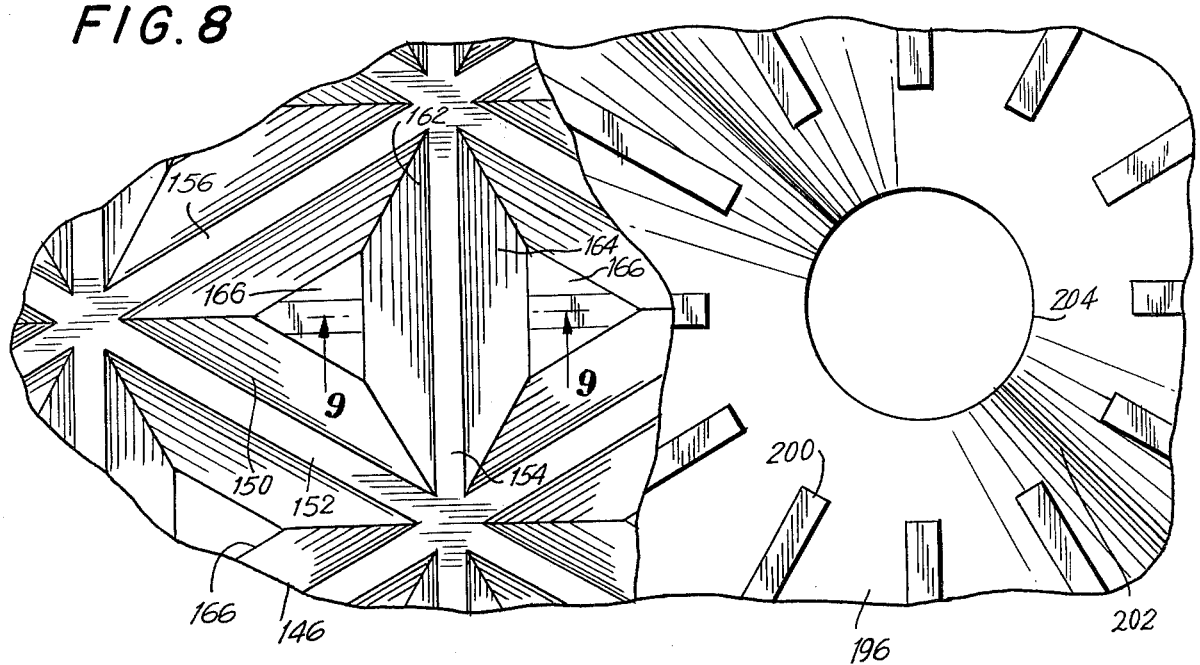
FIG. 8 is a fragmentary cross-sectional view taken along the line 8—8 of FIG. 7.
Figure 9:
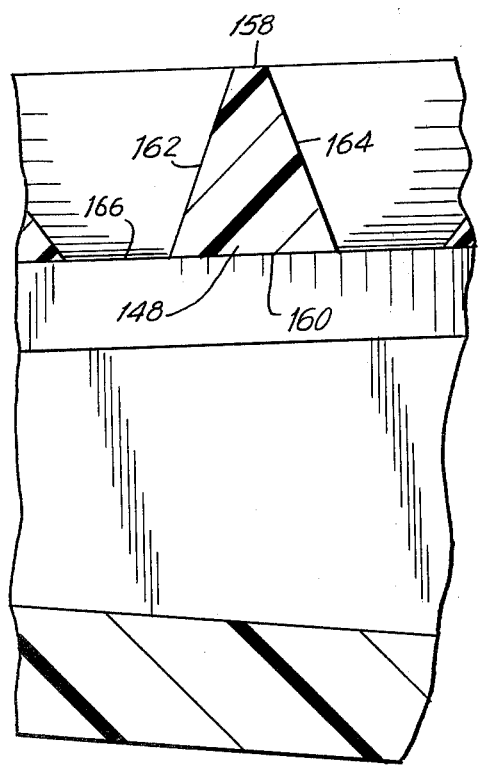
FIG. 9 is a fragmentary cross-sectional view taken along the line 9—9 of FIG. 8.

The overall configuration of the inner basket 30 is best shown in FIG. 5. The inner basket 30 has a generally conical side wall portion 140, the upper edge 142 of which terminates in a flange member 144. The bottom 146 of the inner basket 30 is in the form of a triangular lattice of trapezoidally shaped elements 148. A typical portion of the bottom 146 is shown in FIG. 8. The cell 150 is formed by the lattice elements 152, 154, 156 which form a triangular cell. The top and bottom surfaces 158, 160 of the lattice element 154 are generally parallel and the side surfaces 162, 164 incline inwardly from the bottom surface 160 as shown in FIG. 9. The inclined surfaces 162, 164 help support the coffee grounds 138 which are placed in the inner basket 30 and the lattice construction makes it possible to easily form a multiplicity of relatively small apertures 166 relatively close together in a relatively thick member without encountering the usual molding problems which occur when an attempt is made to mold a large number of small holes.

The rear portion of the inner basket 30 includes an integrally formed bypass channel 168. The bypass channel 168 leads from the flange member 144 to below the bottom 146 of the inner basket 30 and projects inwardly of the conical side portion 140. The top 170 of the bypass channel 168 communicates with the bypass opening 172 which is formed in the coffee basket cover 28 and receives the flow of bypass water as is indicated by the arrow 174 in FIG. 6. The bypass water is conducted to the bottom of the basket 32 in which the inner basket 30 is mounted. The bypass water as indicated by arrow 180, mixes with and dilutes the coffee brew which passes through the apertures 166 in the bottom of the inner basket 30 as indicated by the arrows 176, 178 in FIGS. 6 and 7.

Figure 3:
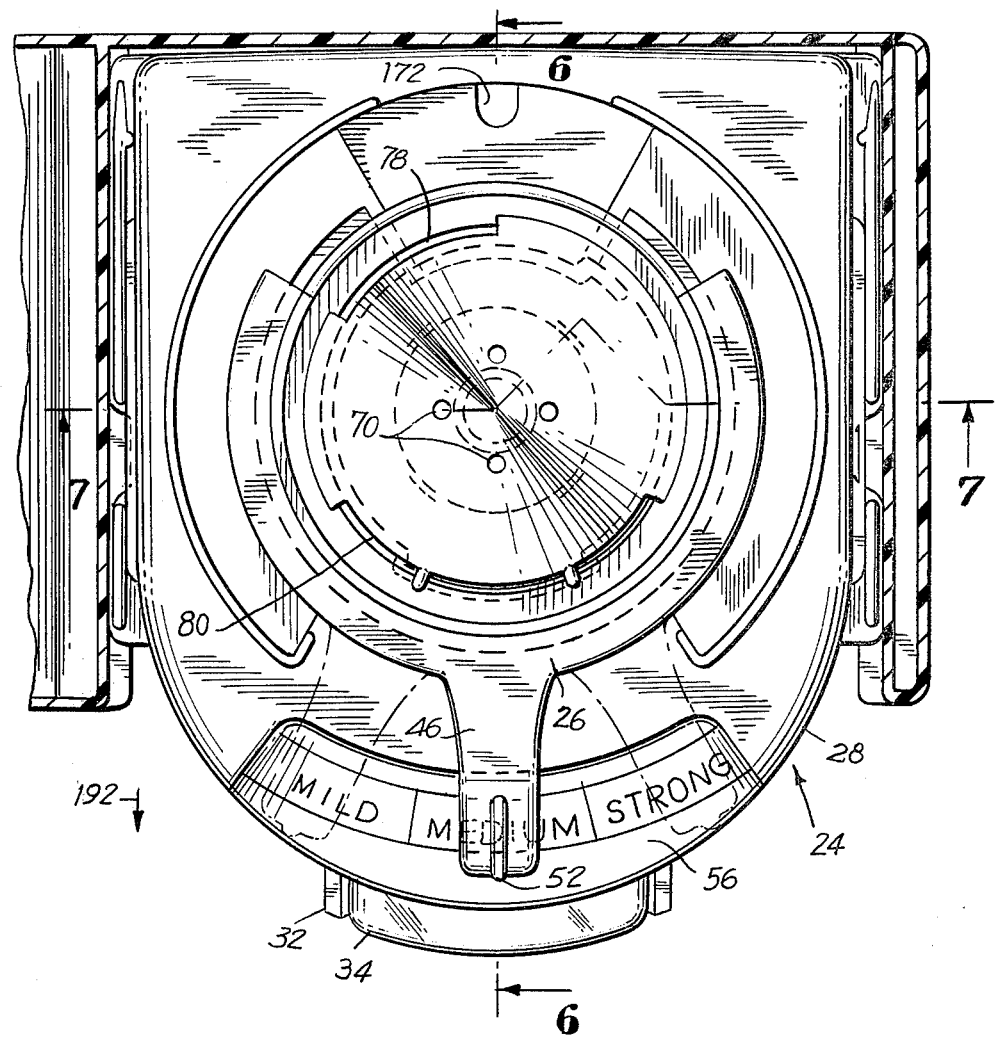
FIG. 3 is a fragmentary top view of the coffeemaker of FIG. 1, drawn to an enlarged scale, partially in section, with alternative positions of the water restrictor member shown in broken lines.
Figure 4:
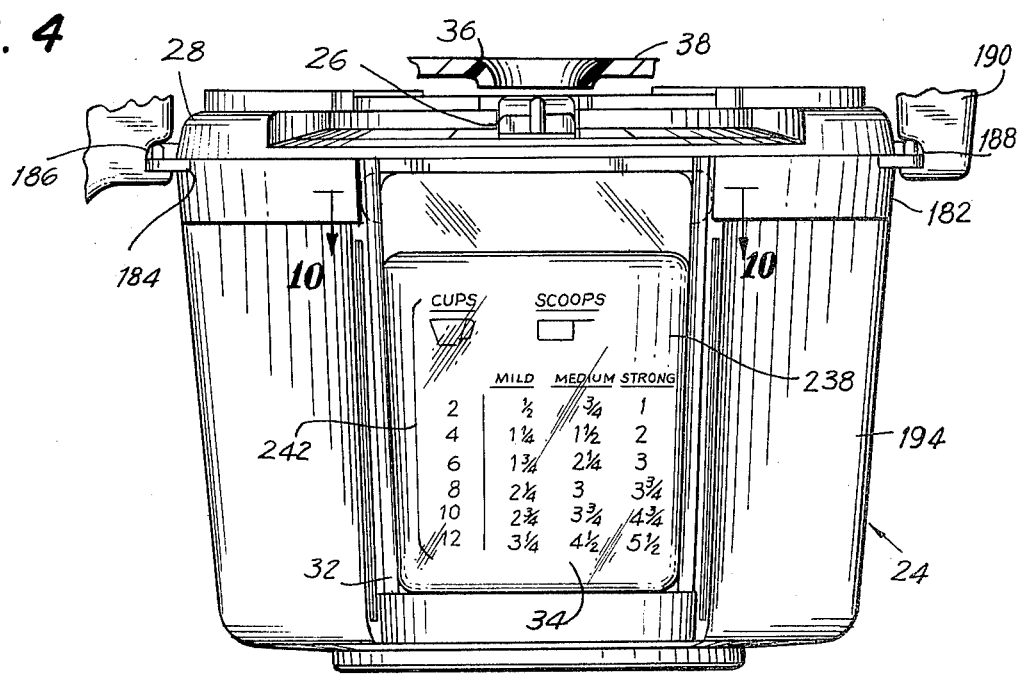
FIG. 4 is a fragmentary side view of the coffeemaker of FIG. 1, partially in section, and drawn to an enlarged scale.
Figure 7:
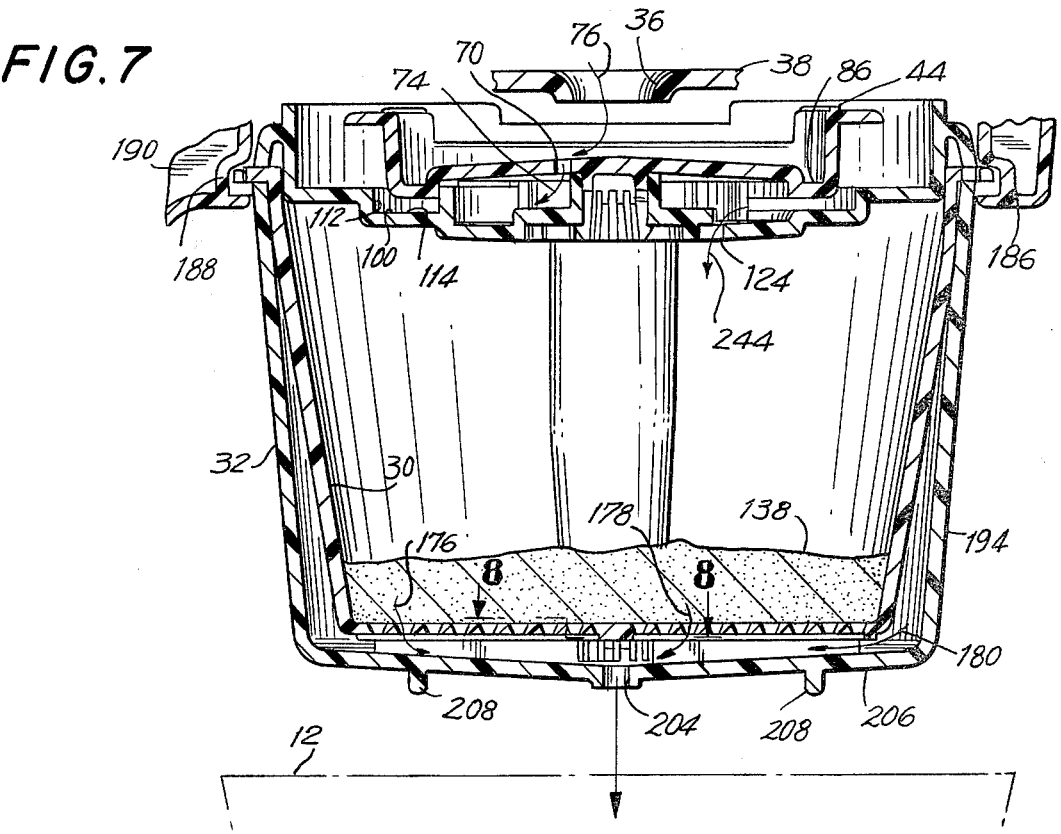
FIG. 7 is a cross-sectional view taken along the line 7—7 of FIG. 3.

The basket 32 is best shown in FIGS. 1, 3, 4, 5, 6 and 7. The upper portion of the basket 32 includes a flange member 184 which engages the slots 186, 188 which are formed in the support member 190 of the base 14 as is shown in FIGS. 1, 4 and 7. The basket 32 can be easily removed from the slots 186, 188 for insertion of coffee into the inner basket 30 by sliding it forward in the direction shown by the arrow 192 in FIG. 3. The side wall portion 194 of the coffee basket 32 is generally conical and projects downward from the flange 184 and terminates in a dished bottom 196. The upper surface 198 of the bottom 196 includes a plurality of ribs 200 which are best shown in FIGS. 5 and 8. The ribs 200 are radially disposed around a central portion 202 which includes a central opening 204. The lower surface 206 of the bottom 196 includes a rib 208 which enables the basket 32 to remain erect when removed from the support member 190 and placed on a flat surface.

Figure 10:
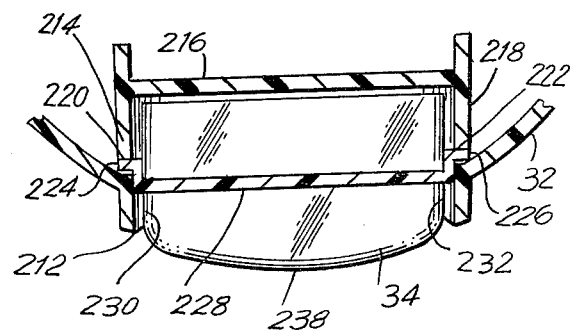
FIG. 10 is a fragmentary cross-sectional view taken along the line 10—10 of FIG. 4.

Referring to FIG. 6, the front portion 210 of the doffee basket 32 includes mounting provisions for the coffee scoop 34 which is a part of the variable strength brew apparatus 12. Referring now to FIG. 10, the mounting provisions include a recessed portion 212 which is formed by the wall portions 214, 216, 218 of the basket 32. The wall portions 214, 218 include slots 220 and 222 which engage and retain the flange portions 224, 226 which are formed on the flange member 228 of the coffee scoop 34. The coffee scoop 34 comprises the side walls 230, 232 the front and back walls 234, 236, and the bottom wall 238. The flange 228 projects from the front wall 236 as is shown in FIGS. 6 and 17. The side wall 230 includes the horizontal index marks 240 and indicia indicating ¼, ½, and ¾ of the volume of the scoop 34. The scoop 34 is preferably made of a transparent or translucent plastic to facilitate reading the level of coffee within the scoop. The indicia and index marks on the side of the cup are used in conjunction with the tabular indicia 242 on the bottom wall 238 of the scoop 34 and the water restrictor member 26 during operation of the apparatus 12 in a manner which will be presently described. The tabular indicia 242 on the bottom wall 238 of the scoop 34 is best shown in FIG. 4 and is repeated in Table 1 for reference.

TABLE 1

| CUPS | SCOOPS | | |
|---|---|---|---|
| | MILD | MEDIUM | STRONG |
| 2 | ½ | ¾ | 1 |
| 4 | 1¼ | 1½ | 2 |
| 6 | 1¾ | 2¼ | 3 |
| 8 | 2¼ | 3 | 3¾ |
| 10 | 2¾ | 3¾ | 4¾ |
| 12 | 3¼ | 4½ | 5½ |

The tabular indicia relates the number of cups of coffee desired, the desired strength of the brew and the number of scoops or portions of a scoop of coffee which are required in order to achieve the proper ratio of coffee and water.

In use, the coffee basket 32 is removed from the support member 190 and the coffee basket cover 28 is removed. The scoop 34 is used to place an appropriate amount of ground coffee 138 into the inner basket 30 in accordance with the tabular indicia on the bottom wall of the scoop 34. The coffee basket cover 28 is replaced and the indicator member 46 is moved into alignment with the appropriate indicia, MILD, MEDIUM or STRONG on the coffee basket cover 28 as is shown in FIG. 3. The water reservoir 16 is filled to the appropriate level in accordance with the indicia on the water level indicator 17 or on the carafe 12 and with the line cord 20 connected to household current the coffeemaker is activated by the proper switch. The heated water flows through the tubing 22 and then down through the orifice 36 as shown by the arrow 76 in FIG. 6. Because the water restrictor 26 is set to MEDIUM as shown in FIG. 3 a portion of the heated water flows through the holes 70 in the water restrictor 26 as indicated by the arrow 74 and a portion flows through the slot 80. The water which flows through the holes 70 enters the inner basket 30 as indicated by the arrows 72, 74, 244 and passes through the coffee 138 and the resulting brew enters the coffee basket 32 as indicated by the arrows 176, 178. The water which flows through the passage 108 bypasses the inner basket 30 and passes through the bypass channel 168 to enter the coffee basket 32 as indicated by the arrows 174, 180 in FIGS. 6 and 7. The amount of coffee utilized, the water bypass ratios, and the amount of water flowing into the inner basket 30 and bypassing the inner basket 30 for the range of use of the apparatus 24 is shown in Table 2.

With reference to FIG. 12, the slots 78 and 80 control the flow of the heated water. The slot 80 is always open and the slot 78 opens and closes in accordance with the setting of the end portion 50.

The arrangement of the various dam members 88 and the water restrictor member 26 presents a complex and torturous path for the flow of water thereby resulting in a restriction of the flow so that a relatively constant head of water is obtained. This results in a relatively steady flow of water through the coffee grounds at a rate which allows proper brewing to take place.

The apparatus 24 utilizes an approximate ratio of 10 grams of coffee per 6 ounces of water for all strength levels and for the entire range of cups brewed in accordance with the recommendations of the Coffee Brewing Institute. Control of the strength of the brew is accomplished by metering water to bypass the inner basket and the net result is an optimization of the quality of the finished brew for the entire range of cups brewed and for the entire range of brew strengths.

TABLE 2

| NO. OF CUPS BREWED | BREW STRENGTH | HEIGHT OF COFFEE IN INNER BASKET (INCHES) | COFFEE USED | | WATER BYPASS (%) | WATER FLOW INTO INNER BASKET (OZ) | BYPASS WATER (OZ) |
|---|---|---|---|---|---|---|---|
| | | | GRAMS | SCOOPS | | | |
| 2 | STRONG | .56 | 20 | 1 | 0 | 13 | 0 |
| 2 | MEDIUM | .44 | 15 | ¾ | 20 | 10.4 | 2.6 |
| 2 | MILD | .31 | 10 | ½ | 40 | 7.8 | 5.2 |
| 4 | STRONG | .63 | 40 | 2 | 0 | 24 | 0 |
| 4 | MEDIUM | .56 | 30 | 1½ | 20 | 19.2 | 4.8 |
| 4 | MILD | .44 | 25 | 1¼ | 40 | 14.4 | 9.6 |
| 6 | STRONG | .81 | 60 | 3 | 0 | 35 | 0 |
| 6 | MEDIUM | .69 | 45 | 2¼ | 20 | 28 | 7 |
| 6 | MILD | .56 | 35 | 1¾ | 40 | 21 | 14 |
| 8 | STRONG | 1.13 | 75 | 3¾ | 0 | 46 | 0 |
| 8 | MEDIUM | .81 | 60 | 3 | 20 | 36.8 | 9.2 |
| 8 | MILD | .69 | 45 | 2¼ | 40 | 27.6 | 18.4 |
| 10 | STRONG | 1.38 | 95 | 4¾ | 0 | 57 | 0 |
| 10 | MEDIUM | 1.13 | 75 | 3¾ | 20 | 45.6 | 11.4 |
| 10 | MILD | .81 | 55 | 2¾ | 40 | 34.2 | 22.8 |
| 12 | STRONG | 1.44 | 110 | 5½ | 0 | 68 | 0 |
| 12 | MEDIUM | 1.31 | 90 | 4½ | 20 | 54.4 | 13.6 |
| 12 | MILD | .94 | 65 | 3¼ | 40 | 40.8 | 27.2 |

While a preferred embodiment of the invention has been shown and described herein, it is obvious that numerous omissions, changes and additions may be made in such embodiments without departing from the spirit and scope of the invention.

What is claimed is:

1. A coffeemaker with a variable brew strength apparatus comprising a base, a water reservoir mounted in said base, electrically operated heater means mounted in said base and disposed to heat water stored in said reservoir, tubing means connecting said water reservoir and said heater means, coffee carafe means mounted on said base, basket means mounted on said base and disposed to accept heated water from said tubing means and to discharge brewed coffee into said coffee carafe, inner basket means mounted in said basket means for holding coffee grounds, valve means mounted on said basket means capable to directing a measured portion of said water into said inner basket means for brewing coffee and directing a measured portion of said water directly into said basket means, bypassing said inner basket, for diluting the coffee brewed in said inner basket means and coffee scoop means removably mounted on said basket means for introducing measured quantities of coffee into said inner basket means.

2. A coffeemaker according to claim 1 in which said valve means comprises a basket cover, mounted on said basket means, with said basket cover including a channel for conducting water around said inner basket means and into said basket means and water restrictor means rotatably mounted on said basket cover with said water restrictor means disposed to variably open and close said channel.

3. A coffeemaker according to claim 2 in which said water restrictor member is removably mounted on said coffee basket.

4. A coffeemaker according to claim 2 in which said water restrictor means includes a projecting indicator member and in which said basket cover includes indicia markings cooperating with said indicator member to indicate the rotary position of said water restrictor member relative to said basket cover and consequently the amount of water bypassed into said basket means.

5. A coffeemaker according to claim 2 in which said water restrictor means and said basket cover cooperate to form a rotary slide valve.

6. A coffeemaker according to claim 2 in which said water restrictor means includes a central portion having a plurality of centrally located holes and a pair of arcuate slots leading to said basket cover.

7. A coffeemaker according to claim 2 in which said basket cover includes a plurality of apertures leading to said inner basket means with said apertures having a discontinuous cross-section 8. A coffeemaker according to claim 2 in which said basket cover includes a plurality of apertures leading to said inner basket means with said apertures having a non-uniform cross-section.

9. A coffeemaker according to claim 1 further including flow restriction means mounted in said valve means for slowing the flow of heated water through said valve means.

10. A coffeemaker according to claim 1 in which said coffee scoop comprises an open rectangular container having a pair of side walls and a bottom wall.

11. A coffeemaker according to claim 10 in which said bottom wall includes thereon a table relating quantity of cups of coffee, brew strength and number of scoops of ground coffee required to be inserted into said inner basket means.

12. A coffeemaker according to claim 10 in which one of said side walls includes calibrated indicia indicating fractional volumetric portions of said coffee scoop means.

13. A coffeemaker according to claim 10 in which said coffee scoop further comprises a flange member.

14. A coffeemaker according to claim 13 in which said basket means includes a pair of spaced apart projecting wall portions, each of said wall portions including a slotted portion in which said flange member of said coffee scoop is interposed between said projecting wall portions and engages said slotted portions.

* * * * *